United States Patent [19]

Fukui

[11] 4,240,533
[45] Dec. 23, 1980

[54] COASTER BRAKE HUB WITH A GEAR-TRANSMISSION

[75] Inventor: Seiji Fukui, Sakai, Japan

[73] Assignee: Shimano Industrial Company, Limited, Osaka, Japan

[21] Appl. No.: 900,862

[22] Filed: Apr. 28, 1978

[30] Foreign Application Priority Data

May 6, 1977 [JP] Japan .................................. 52/52284

[51] Int. Cl.³ ....................... F16D 41/30; F16H 57/10
[52] U.S. Cl. .................................. 192/6 A; 74/750 B
[58] Field of Search ...................... 192/6 A; 74/750 B

[56] References Cited

U.S. PATENT DOCUMENTS

| | | | |
|---|---|---|---|
| 3,257,868 | 6/1966 | Preece | 192/6 A |
| 3,670,856 | 6/1972 | Segawa | 192/6 A |
| 3,809,195 | 5/1974 | Schulz et al. | 192/6 A |
| 4,069,725 | 1/1978 | Segawa | 192/6 A |

Primary Examiner—C. J. Husar
Assistant Examiner—Conrad Berman
Attorney, Agent, or Firm—Stevens, Davis, Miller & Mosher

[57] ABSTRACT

A bicycle coaster brake hub having a gear-transmission therein is provided with a change-over mechanism between a driving member or clutch always rotatable together therewith and a gear frame including planetary gears and carrying actuators, such as rollers or a clutch, for operating brake shoes of a braking mechanism. The change-over mechanism causes a reverse rotation of the driving member induced by back-pedalling to be transmitted to a ring gear instead of the gear frame, whereby the gear frame is always reversely rotated through the ring gear at any driving speed stage from low to high, thus braking the bicycle wheels with a uniform braking effect regardless of what speed stage the gear transmission is in at the time of braking.

3 Claims, 8 Drawing Figures

COASTER BRAKE HUB WITH A GEAR-TRANSMISSION

This invention relates to a bicycle coaster brake hub having a gear-transmission therein, which is adapted to brake the rotation of bicycle wheels by a back-pedalling operation.

Generally, this kind of coaster brake hub comprises a non-rotatable shaft fixed to the bicycle frame, a hub shell, a driving member supported to the fixed shaft to be rotatable forwardly and reversely, a gear-transmission for transmitting the driving force from the driving member to the hub shell, and a braking mechanism for braking the hub shell by a reverse rotation of the driving member caused by back-pedalling. The coaster brake hub is so constructed that the driving member is normally forwardly rotated by pedalling through a drive chain to transmit the driving force from the same to the hub shell at a predetermined speed ratio through a clutch and gear-transmission. The driving member can be reversely rotated by a back-pedalling operation to actuate the braking mechanism through the clutch and gear-transmission to thereby brake the rotation of hub shell.

The gear-transmission comprises a sun gear provided on the fixed shaft, a plurality of planetary gears in mesh with the sun gear, a gear frame carrying the planetary gears, a ring gear having inner teeth in mesh with the planetary gears, and transmitting members provided at the gear frame and ring gear, so that the driving force is transmitted from the driving member selectively to the gear frame or ring gear through the clutch to thereby position the bicycle speed at one of the high, middle and low stages.

For driving the bicycle at high speed, the driving force is transmitted from the driving member to the hub shell at the high speed stage in acceleration through the gear-transmission comprising the gear frame, planetary gears and ring gear; at middle speed, the driving force is transmitted to the hub shell through the ring gear only; and at low speed, the driving force is transmitted to the hub shell through the gear-transmission in deceleration comprising the ring gear, planetary gears and gear frame. For braking the hub shell, the driving member is reversely rotated to rotate the gear frame reversely through each of the aforesaid transmissions so as to expand the brake shoes radially outwardly to come in contact with the inner periphery of the hub shell.

When the gear frame is reversely rotated for the braking action, the rotational speed of the gear frame and torque applied to the brake shoes by the gear frame are different in each speed stage causing a difference in the braking effect. Moreover, the rotary angle of cranking necessary for braking is not constant, for each speed stage thereby causing a delayed emergency braking action.

This invention has been designed in view of the aforesaid problems. An object of the invention is to provide a coaster brake hub housing therein multi-speed gear-transmissions which has both a constant braking effect and a constant rotary angle of cranking necessary for the braking action, no matter what the speed stage at the time of braking.

The invention provides in the conventional coaster brake hub constructed as described above, a change-over mechanism which is provided between the gear frame and the driving member side (including the clutch) so that the transmission of the driving force to the gear frame from the driving member when reversely rotated may be intercepted, or changed to the ring gear. When the hub shell of a coaster brake hub having a three speed gear-transmissions, for example, is driven at high speed through transmission in the order of the driving member, gear frame, planetary gears and ring gear, the braking action by back-pedalling causes the change-over mechanism to intercept the high speed transmission immediately and change it to the low speed transmission by coupling the driving member directly to the ring gear, whereby the gear frame is always reversely rotated through the ring gear regardless of any driving speed stage.

Generally, the gear-transmissions of coaster brake hubs are of two types, each of which changes the speed by axially moving the gear frame and ring gear. In one type the gear frame and ring gear are axially movable and engaged in association with each other, and in the other type a clutch is axially moved which is provided between the driving member and the gear frame and ring gear so as to relay the driving force from the driving member. This invention is applicable to both types of gear transmissions in such a manner that the change-over mechanism for the former type, provided between the driving member and the gear frame and for the latter type, provided between the clutch and the gear frame. Thus, the driving member inclusive of the clutch is embraced by the expression "the driving member side" in the foregoing description.

The above and other objects and novel features of the invention will be more apparent from the following description in accordance with the accompanying drawings, in which:

Figure 1:
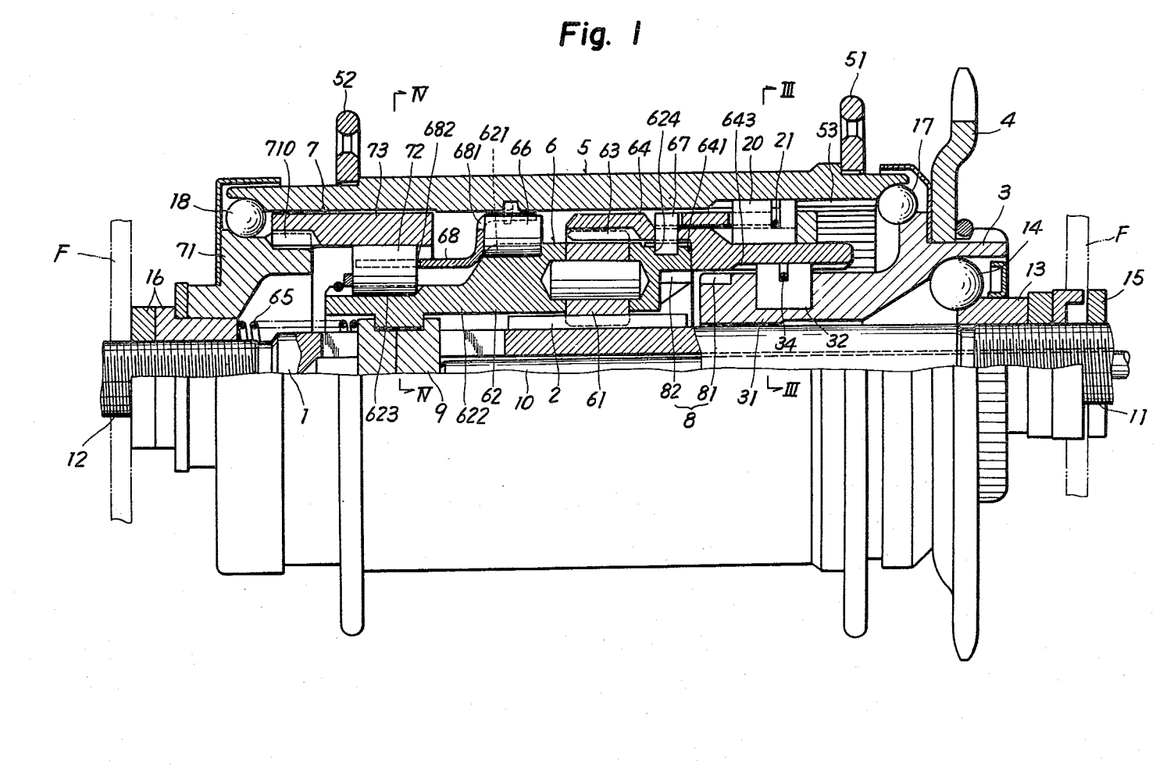
FIG. 1 is a partially cutaway front view of the coaster brake hub of a typical embodiment of the invention in its middle speed condition.

The coaster brake hub shown in FIG. 1 is capable of changing the speed at the high, middle and low stages. It is composed mainly of a non-rotatable shaft 1 fixed to the bicycle frame F having a sun gear 2 at the outer periphery of a substantially intermediate portion of the same, a driving member 3 rotatably supported to the fixed shaft 1 having at its outer periphery a sprocket 4, a hub shell 5 supported to the driving member 3 in relation of being rotatable with respect thereto, a gear-transmission 6 housed within the hub shell 5 and mounted to be axially movable for changing the speed transmitted to the hub shell 5, and a braking mechanism 7 operable when the driving member 3 is reversely rotated to stop the rotation of the hub shell 5.

In greater detail, the fixed shaft 1 is provided at its both axial ends with screw threads 11 and 12. One thread 11 at the right side of FIG. 1 is screwed with a ball holder 13 rotatably supporting the driving member 3 through balls 14 and with a nut 15 through which one axial end of the fixed shaft 1 is fixed to the bicycle frame F. The other thread 12 at the left side is screwed with a brake cone 71 which is fixed in position by a lock nut 16 and with a nut (not shown) similar to that with which the other axial end of the shaft 1 is fixed to the bicycle frame F.

Figure 3:
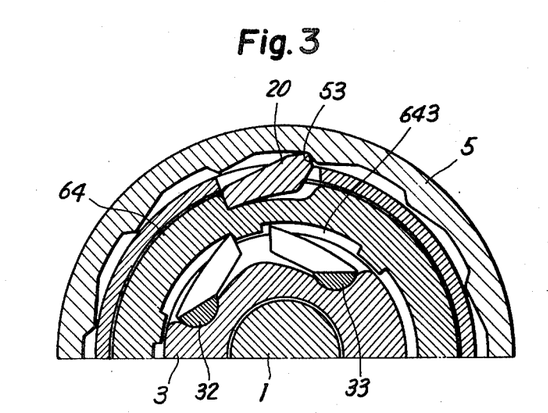
FIG. 3 is a sectional view taken on Line III—III in FIG. 1.
Figure 4:
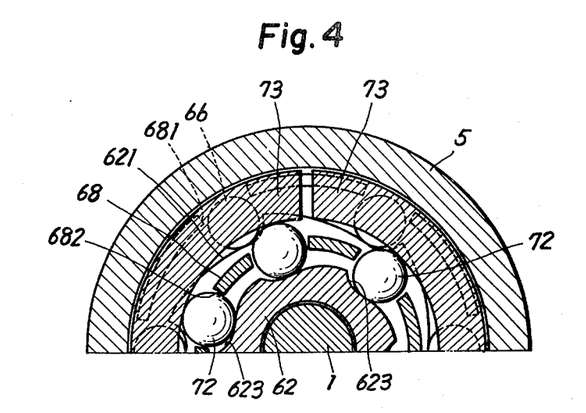
FIG. 4 is a sectional view taken on Line IV—IV in FIG. 1.

The driving member 3 is cylindrical and has at its inner surface a ball race for the balls 14; at a side of the gear-transmission 6 a cylindrical extension 31; and at its intermediate outer periphery transmitting members 32 which transmit the normal rotation of the driving member 3 to a ring gear 64 of the gear-transmittion 6 and transmitting members 33 which transmit the reverse rotation of the driving member 3 to the ring gear 64. The transmitting members 32 and 33 are, as shown in FIG. 3, composed of pawls 20 and supported by a single ring-like shaped spring 34. The pawls 20 mesh with engaging grooves 643 on the inner periphery of the ring gear 64 to be hereinafter described, so as to transmit the formal (forward) and reverse rotations of the driving member 3 to the ring gear 64, respectively, the transmitting members 32 and 33 and engaging grooves 643 constituting a first transmitting means. At the utmost end of the extension 31 is formed a transmitting portion for transmitting the normal rotation of the driving member 3 to a gear frame 62, and the transmitting portion together with a driven portion at the gear frame 62 to be hereinafter described, constitutes a second transmitting means.

At the outer periphery of the driving member 3 is provided a ball race for balls 17 supporting therethrough one axial end of the hub shell 5. Also, at the outer periphery of the brake cone 71 is formed a ball race for balls 18 supporting therethrough the other axial end of the hub shell 5, whereby the hub shell 5 is rotatably supported with respect to the fixed shaft 1 through the balls 17 and 18 carried by both the ball races, respectively.

The hub shell 5 has at the outer peripheries of both axial ends thereof a pair of flanges 51 and 52 and at the inner periphery ratchet teeth 53 in mesh with middle and high speed transmitting pawls to be hereinafter described.

The gear-transmission 6 housed within the hub shell 5 includes the sun gear 2, the gear frame 62 carrying planetary gears 61 in mesh with the sun gear 2, and the ring gear 64 having inner teeth 63 in mesh with the planetary gears 61 and carrying the high and middle speed transmitting pawls 20. The gear frame 62 is constantly axially movable and is urged away from the brake cone 71, i.e. toward the driving member 3, by a spring 65 inserted between the brake cone 71 and the gear frame 62. At the outer periphery of the gear frame 62 at a side of the braking mechanism 7 are provided cam faces 621. Between the cam faces 621 and the inner periphery of the hub shell 5 are provided low speed transmitting members 66 comprising rollers for transmitting the normal rotation torque of the driving member 3 to the hub shell 5. A cylindrical extension 622 is provided axially ahead of the cam faces 621. At the outer periphery of the extension 622 are provided cam faces 623 which are tapered in the reverse direction to the cam faces 621 and between the cam faces 623 and brake shoes 73 are provided braking actuators 72 comprising rollers for transmitting the reversely rotational torque from the driving member 3 to the brake shoes 73. The gear frame 62 is provided at its end portion at a side of the driving member 3 with a driven portion constituting a second transmitting means which cooperates with the transmitting portion at the driving member 3, and at the outer periphery of the axially intermediate portions with annular engaging grooves 624 into which are inserted pins 67 for engaging therethrough the ring gear 64 with the gear frame 62.

The transmitting members 66 and actuators 72 with respect to the cam faces 621 and 623 are set in position with a tubular cage 68, the cage 68 being provided at its both axial ends with bores 681 and 682 into which the transmitting members 66 and actuators 72 are inserted, respectively.

The ring gear 64 is provided at its inner periphery at a side of the gear frame 62 with teeth 63 in mesh with the planetary gears 61, and at its axially central portion with a stepped portion 641 abutting against the end face of the gear frame 62 at a side of the driving member 3 and with through holes 642 receiving therein the pins 67. Hence, the pins 67 are inserted through the holes 642 and engaged at the tips with the engaging grooves 624 so that the ring gear 64 may be rotated relatively to the gear frame 62 and axially movable in associated therewith. At the inner periphery of the end portion of the ring gear 64 at a side of the driving member 3 are provided grooves 643 engageable with the transmitting members 32 and 33 at the driving member 3 and constituting a first transmitting means. The ring gear 64 also carries at its outer periphery the transmitting pawls 20 by means of a ring-like shaped spring 21.

The braking mechanism 7 comprises the brake cone 71 screwed with the left side thread 12 of the fixed shaft 1 carrying one end of the hub shell 5 through balls 18, the actuators 72 transmitting the reverse rotation of the gear frame 62 to the hub shell 5, and two semicylindrical brake shoes 73. Between the brake cone 71 and the brake shoes 73 is provided an engaging portion 710 for restricting the rotation of the brake shoes 73 and allowing the brake shoes 73 to approach or leave the inner periphery of the hub shell 5. The actuators 72 are inserted between the inner surface of each of the brake shoes 73 and the transmitting cam faces 623 for braking, so that the reverse rotation of the gear frame 62 is transmitted from the cam faces 623 to the brake shoes 73 through the actuators 72, thereby expanding the brake shoes 73 radially outwardly to be in contact with the inner periphery of the hub shell 5.

This invention is applied to the well-known coaster brake hub constructed as described above, in such a manner that between the driving member 3 and the gear frame 62 is provided a change-over mechanism 8, whereby when the driving member 3 is rotated reversely, the route of transmitting the reverse rotation to the gear frame 62 through the second transmitting means is forcibly intercepted so as to be changed into a route from the driving member 3 to the ring gear 64 through the first transmitting means, thereby reversely rotating the gear frame 62 by means of the ring gear 64.

Figure 5:
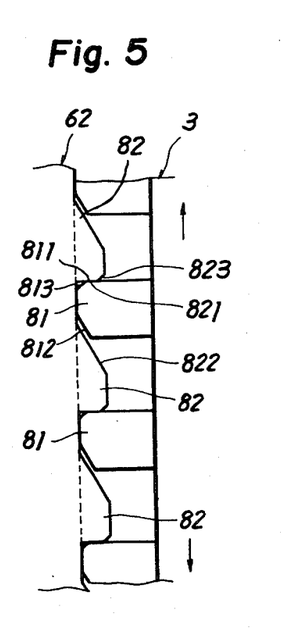
FIG. 5 is an enlarged view showing engagement of the change-over mechanism.

The changing-over mechanism 8 is incorporated with the second transmitting means in such a manner that prime cam means 81 including tapered faces is formed at the transmitting portion of the inwardly foremost end of the driving member 3 and subordinate cam means 82 including tapered faces is formed at the driven portion of the end portion of the gear frame 62 at a side nearest the driving member 3, the cam means 81 and 82 being arranged circumferentially of both the members, respectively, to be opposite to each other as shown in FIG. 5. Both the cam means 81 and 82 include: engaging faces 811 and 821 respectively extending axially of the driving member 3 and gear frame 62 and engageable with each other to transmit the normal rotation of the driving member 3 to the gear frame 62; and faces 812 and 822 tapered to the axial direction so as to move the ring gear 64 and gear frame 62 axially with respect to the driving member 3 when rotating reversely. The engaging faces 811 and 821 are sliced off at their axially outward corners to form chamfers 813 and 823 respectively. The chamfers 813 and 823 serve to move the subordinate cam means 82 quickly apart from the prime cam means 81 when axially moving the gear frame 62 and ring gear 64 for changing the speed, and are subjected to a torque component force when contacting with each other which further contributes to their being disengaged quickly from each other.

When the hub shell 5 is driven at high speed, the portions of transmitting members 32 and 33 adjacent to the engaging portions 643 at the inner periphery of the ring gear 64 are pressed down (FIG. 2), whereby the engaging members 32 and 33 are disengaged from the engaging portions 643 to transmit the normal rotation of the driving member 3 to the gear frame 62 through the second transmitting means incorporated with the changing-over mechanism 8 so that both the cam means 81 and 82 are engaged. In this instance, a length l with which the engaging faces 811 and 821 at both the cam means 81 and 82 are engageable with each other is made larger than that $l_1$ through which the transmitting members 32 and 33 travel to be engaged with the engaging portions 643 at the ring gear 64, respectively, whereby the reverse rotation of the driving member 3 is transmitted to the ring gear 64 prior to disengagement of the subordinate cam means 82 from the prime cam means 81.

Incidentally, the changing-over mechanism 8 need not be particularly limited to the described construction as long as it is possible to transmit the normal rotation of the driving member 3 to the gear frame 62 and move the gear frame 62 and ring gear 64 axially with respect to the driving member 3 when the latter is reversely rotating. Either the prime or subordinate cam means may be provided at the driving member 3 or gear frame 62.

In FIG. 1, the reference numeral 9 designates a speed-change key for moving the gear frame 62 against the spring 65. The key 9 is abutted at its one side against one end of a rod 10 axially reciprocating within the central hollow of the fixed shaft 1, the rod 10 being moved leftward in FIG. 1 to compress the spring 65, whereby the gear frame 62 is moved rightward by the reaction of spring through the key 9.

Next, the function of the gear-transmission 6 constructed as describes will be detailed.

The middle speed driving condition is shown in FIG. 1, in which the cam means 81 and 82 of the changing-over mechanism 8 are not engaged but the transmitting members 32 are engaged with the engaging portions 643 at the ring gear 64 for transmitting the normal rotation of the driving member 3.

Accordingly, the driving force is transmitted from the driving member 3 to the engaging portions 643 at the ring gear 64 through the transmitting members 32 and then transmitted unchanged to the hub shell 5 through the transmitting pawls 20 at a speed ratio of 1:1 in relation of the driving member 3 with ring gear 64.

For high speed operation, the gear frame 62 and ring gear 64 are moved rightward in FIG. 1 to allow the cam means 81 and 82 to be engaged with each other, whereby the inner peripheral portions adjacent to the engaging portions 643 at the ring gear 64 prevent the transmitting member 32 from rising. In this condition, the driving force is transmitted from the driving member 3 to the gear frame 62, accelerated through the planetary gears 61, and transmitted to the ring gear 64 through inner teeth 63 and then from the ring gear 64 to the hub shell 5 through the transmitting pawls 20, thus driving the hub shell 5 at high speed.

For low speed operation, the gear frame 62 and ring gear 64 shown in FIG. 1 are moved leftward, whereby the inner peripheral portions adjacent to the ratchet teeth 53 at the hub shell 5 prevent the transmitting pawls 20 from rising. In this condition, the driving force is transmitted from the driving member 3 to the ring gear 64 through the transmitting members 32, decelerated through the planetary gears 61, and transmitted therethrough to the gear frame 62 and then to the hub shell 5 through the low speed cam faces 621 and transmitting members 66, thus rotating the hub shell 5 at low speed.

In addition, when the gear frame 62 and ring gear 64 are moved rightward in FIG. 1 for changing the speed to high, the aforesaid chamfers 813 and 823 at the cam means 81 and 82 allow the subordinate cam means 82 to leave the prime cam means 81 quickly to the extent of areas of the chamfers 813 and 823 so that the driving member 3 is prevented from being engaged with both the gear frame 62 and ring gear 64 for driving the hub shell 5.

Next, the braking action for the bicycle running through the normally rotating hub shell 5 as described above will be detailed in the following description.

The braking action is, at any speed stage, carried out in such a manner that the driving member 3 is reversely rotated by back-pedalling to rotate the gear frame 62 reversely, whereby the braking cam face 623 allows the brake shoes 73 to expand radially outwardly through the actuators 72.

For braking the hub shell 5 when driven at high speed, the subordinate cam means 82 at the gear frame 62 tends to slidably leave the driving member 3 through the tapered cam faces 812 at the prime cam means 81 following the reversely rotating driving member 3, at the same time, the cam means 82 is subjected to the component force of torque so as to leave the cam means 81 rapidly, and the transmitting members 33 for reverse rotation are engaged with the engaging portions 643 at the ring gear 64, whereby the ring gear 64 allows the gear frame 62 to rotate reversely through the planetary gears 61. When driving the hub shell 5 at middle or low speed, the reverse rotation of the driving member 3 is transmitted directly to the ring gear 64, whereby the gear frame 62 is reversely rotated through the planetary gears 61. At any speed stage, the driving member 3 is reversely rotated to rotate the gear frame 62 reversely inevitably through the transmitting members 33 for the reverse rotation, whereby the gear frame 62 is reversely rotated through the ring gear 64 and planetary gears 61 at a constant rotational speed and also the brake shoes 73 are always subjected to equal torque from the gear frame 62 through the actuators 72.

The aforesaid gear-transmission 6 changes the bicycle speed by axially moving the gear frame 62 and ring gear 64 in associated with each other. This invention, however, is also applicable to the transmission hub in which the gear frame 62 and ring gear 64 are not axially movable but a clutch 100 is provided between the gear frame 62 and ring gear 64 and the driving member 3 for relaying the driving force, whereby the clutch 100 is axially moved to change the speed.

Figure 6:
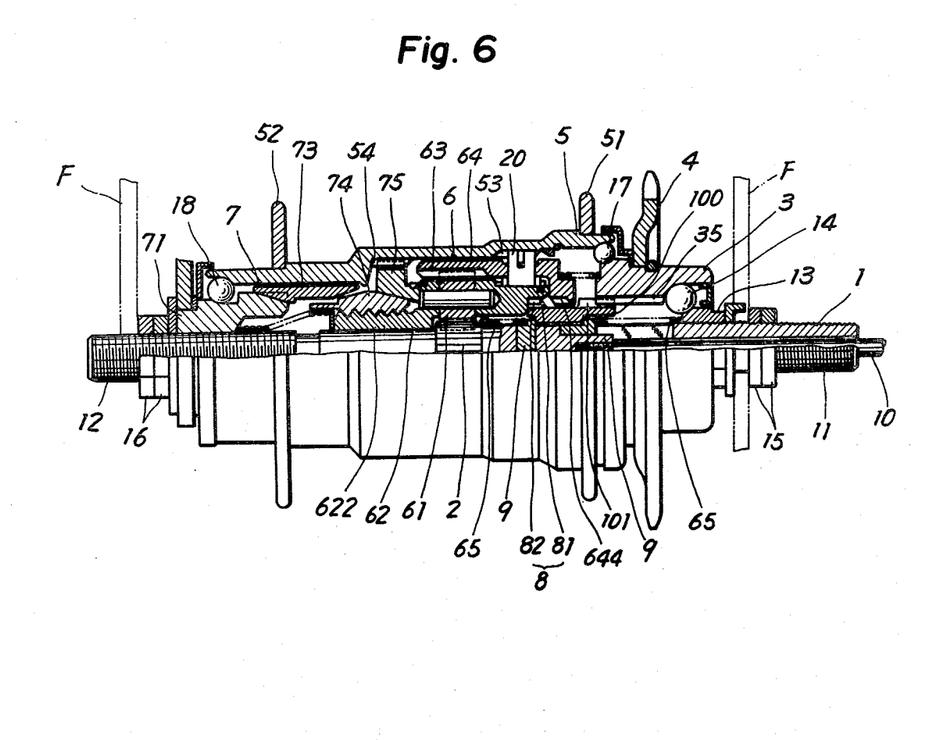
FIG. 6 is a partially cutaway front view of a modified embodiment.

In this instance, the change-over mechanism 8 is, as shown in FIG. 6, provided between the clutch 100 and the gear frame 62.

Figure 7:
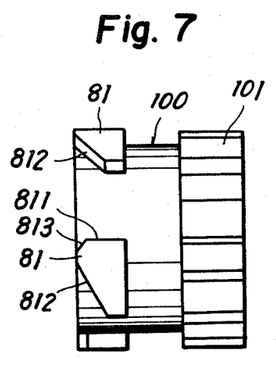
FIG. 7 is a front view of the clutch only.
Figure 8:
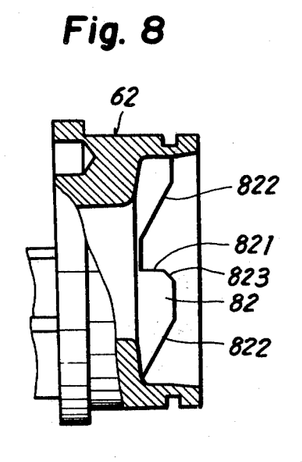
FIG. 8 is a partially omitted sectional view of the gear frame only.

The clutch 100 is cylindrical as shown in FIG. 7 and has male spline 101 at the outer periphery of one axial end and the prime cam means 81 at the other axial end. At the inner periphery of the driving member 3 is provided female spline 35, whereby the driving member 3 and clutch 100 are coupled through the male and female splines 101 and 35 and always rotate together in the normal and reverse directions. At the inner periphery of one axial end portion of the ring gear 64 at a side of the driving member 3 are provided grooves 644 engageable with the engaging faces 811 at the prime cam means 81 and at the inner periphery of one axial end portion of the gear frame 62 at a side of the driving member 3 is provided the subordinate cam means 82 including the engaging faces 821 and tapered cam faces 822 respectively in engagement with the engaging faces 811 and tapered cam faces 812 of the prime cam means 81.

Figure 2:
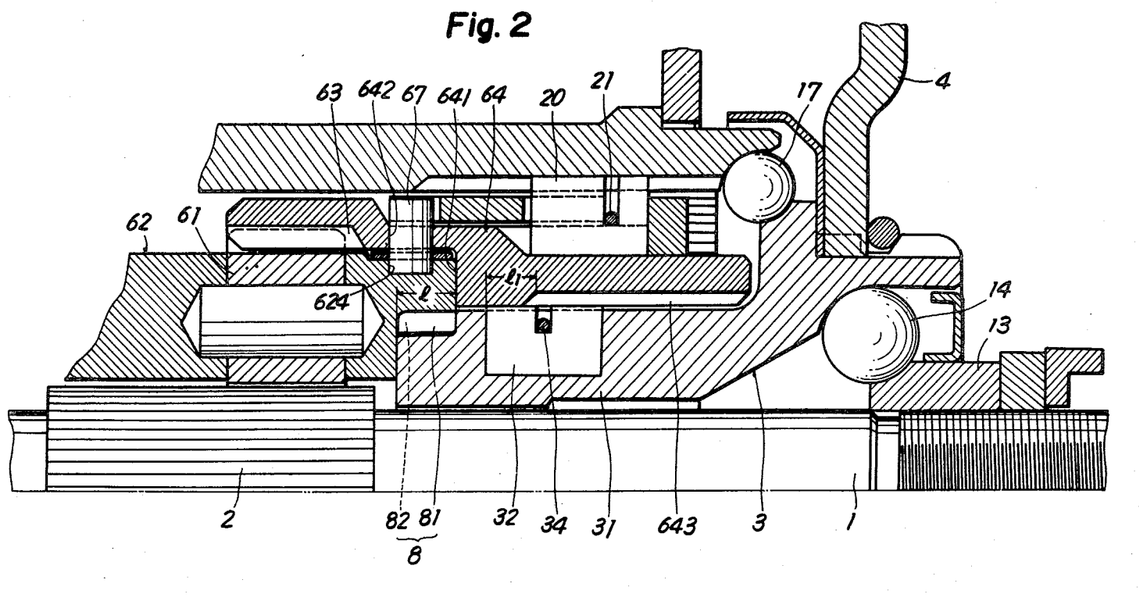
FIG 2 is a partially omitted sectional view of the hub in its high speed condition.

The gear-transmission 6 shown in FIG. 6 employs no rollers shown in FIGS. 1 and 2, but a clutch cone 74 as the actuator for the brake shoes 73, so that the clutch cone 74 may be screwed with the threaded extension 622 of the gear frame 62 in the same pitch. Also, a ring 75 toothed at the outer periphery thereof may be replaced by the transmitting members of rollers in FIGS. 1 and 2, and teeth 54 are provided at the inner periphery of the hub shell 5 to be meshed with the ring 75. In this embodiment, springs 65 are provided between the speedchange key 9 engageable with the clutch 100 and the ball holder 13, and between the key 9 and the end face of sun gear 2.

In this type of gear-transmission, the reverse rotation of the driving member by back-pedalling is also transmitted from the ring gear 64 to the gear frame 62 at any speed stage of high, middle or low, thereby braking the bicycle wheels.

In detail, when the hub shell is driven at high speed, the prime cam means 81 at the clutch 100 is slidably moved axially tending to leave the gear frame 62 through the tapered cam faces 822 at the subordinate cam means 82. At the same time, the cam means 81 is subjected to the component force of torque so as to leave the cam means 82 rapidly and then engage at the engaging faces 811 with the engaging grooves 644, whereby the ring gear 64 reversely rotates to allow the gear frame 62 to rotate reversely through the planetary gears 61. When the hub shell is driven at middle or low speed, the driving member 3 is reversely rotated to allow the clutch 100 to rotate reversely at once so that the gear frame 62 is reversely rotated through the ring gear 64 and the planetary gears 61. Thus, no matter what the driving conditions, the clutch 100 acts to always reversely rotate the gear frame 62 through the ring gear 64 and the planetary gears 61, at constant speed thus equalizing the torque applied from the gear frame 62 to the brake shoes 73 through the clutch cone 74.

As clearly understood from the aforesaid description, the coaster brake hub of the invention is constructed that the change-over mechanism is provided between the driving member, or a clutch always in mesh therewith, and the gear frame, so that the transmission from the driving member or clutch to the gear frame is, when the driving member is reversely rotated, forcibly switched to the ring gear. Hence, even when the hub shell is driven at any speed stage, the reverse rotation of driving member is transmitted from the clutch to the gear frame through the ring gear, thereby reversely rotating the gear frame for the braking action. As a result, the braking effect is made constant under all driving conditions and no malfunction occurs in back-pedalling, and a constant braking effect is secured to prevent malfunctions induced by an emergency braking action or due to a delayed braking effect.

While preferred embodiments of the invention have been described using specific terms, such description is for illustrative purpose only, and it is to be understood that changes and variations may be made without departing from the spirit or scope of the following claims.

What is claimed is:

1. A coaster brake hub having therein a gear-transmission and a back-pedalling braking mechanism comprising:

a fixed shaft;

a driving member having a sprocket and rotatably supported to one axial end of said fixed shaft;

a brake cone rigidly fixed to the other axial end of said fixed shaft;

a hub shell rotatably supported between said driving member and said brake cone;

a multiple stage gear-transmission housed within said hub shell for changeably transmitting the forward driving force from said driving member to said hub shell when said driving member rotates in a forward direction, said gear-transmission comprising a sun gear provided on said fixed shaft, a cylindrical gear frame including a plurality of planetary gears in mesh with said sun gear, a ring gear including inner teeth in mesh with said planetary gears, transmitting members provided between said gear frame and ring gear and the inner periphery of said hub shell and, means for selectively coupling the forward driving force from said driving member to one of said gear frame and ring gear;

a braking mechanism housed within said hub shell comprising at least two semi-cylindrical brake shoes, actuators for radially expanding said brake shoes pressing them against the inner periphery of said hub shell, and means for supporting said actuators to said gear frame so that said actuators are operated by reverse rotation of said gear frame;

a change-over mechanism inserted between said driving member and said gear frame, said change-over mechanism operating to forcibly intercept the force transmitting route from said driving member to said gear frame when said driving member is reversely rotated and to establish a force transmitting route from said driving member to said ring gear causing said gear frame to be reversely rotated by said ring gear, thus operating said actuators which press said brake shoes against the inner periphery of said hub shell;

said gear frame and ring gear being axially moveable and engaged together to axially move in unison, said gear frame and ring gear being selectively engaged with said driving member;

said driving member having a cylindrical extension extending within said hub shell, the extension being opposite at a substantially intermediate outer periphery thereof to the inner periphery of said ring gear and being opposite at the foremost end to said gear frame, said coaster brake hub further comprising a first transmitting means consisting of pawls and respective grooves engageable therewith provided between said intermediate portion of said extension and said opposite inner periphery of said ring gear for transmitting the forward driving force from said driving member to said ring gear, and a second transmitting means provided between the foremost end of said extension and the opposite face of said gear frame for transmitting the forward driving force from said driving member to said gear frame, said second transmitting means comprising prime cam means and subordinate cam means for engaging with said prime cam means, said prime and subordinate cam means having engaging faces respectively, said first transmitting means engaging grooves having an axial extent such that said pawls at the first transmitting means are disengaged from said engaging grooves when said prime cam means at said second transmitting means are engaged with said subordinate cam means thereof, said pawls being engaged with said engaging grooves after said prime cam means is relatively moved out of a range where said prime and subordinate cams are in driving engagement with each other, said first and second transmitting means being alternately operable, said second transmitting means including said change-over mechanism, said change-over mechanism, when said driving member is rotating reversely, forcibly moving said gear frame apart from said driving member so that the driving force from said driving member no longer passes through the second transmitting means but rather passes through the first transmitting means.

2. The coaster brake hub as set forth in claim 1, wherein said prime cam and subordinate cam means have tapered faces respectively.

3. The coaster brake hub as set forth in claim 1, wherein between said driving member and said gear frame and ring gear is provided a cylindrical clutch for relaying the driving force from said driving member, said clutch being made axially movable and spline-coupled at one axial end with said driving member, said clutch being moveable to transmit driving force from said driving member to one of said gear frame and ring gear, said change-over mechanism being provided between said clutch and said gear frame.

* * * * *